United States Patent [19]
Frich

[11] Patent Number: 6,074,156
[45] Date of Patent: Jun. 13, 2000

[54] LIBRARY CART LOADING SYSTEM AND METHOD

[76] Inventor: Mark R. Frich, 21 Ferndale St., Maplewood, Minn. 55119

[21] Appl. No.: 09/309,377

[22] Filed: May 10, 1999

[51] Int. Cl.[7] .................................................. B65G 57/00
[52] U.S. Cl. .............................. 414/331.01; 414/331.06; 414/331.08; 414/331.1; 414/331.11; 414/331.15; 414/575; 414/798.9; 414/809
[58] Field of Search .......................... 414/331, 331.11, 414/331.06, 354, 575, 798.9, 809, 331.08, 331.09, 331.1, 331.15, 331.16, 331.18

[56] References Cited

U.S. PATENT DOCUMENTS

| | | |
|---|---|---|
| 3,637,095 | 1/1972 | Kampfer ............................ 414/331.08 |
| 3,640,407 | 2/1972 | Anastasio et al. . |
| 3,776,404 | 12/1973 | Anastasio et al. . |
| 4,055,339 | 10/1977 | Looney . |
| 4,189,133 | 2/1980 | Arrasmith et al. . |
| 4,229,134 | 10/1980 | Reist . |
| 4,462,746 | 7/1984 | Smets ................................... 414/798.9 |
| 4,634,333 | 1/1987 | Butterly, Jr. et al. .................... 414/809 |
| 4,669,047 | 5/1987 | Chucta ............................... 414/331.11 |
| 5,379,992 | 1/1995 | Holmes et al. ....................... 414/798.9 |
| 5,595,468 | 1/1997 | Wald .................................. 414/331.09 |
| 5,622,470 | 4/1997 | Schaefer et al. ...................... 414/331.1 |
| 5,690,463 | 11/1997 | Yoshie . |

FOREIGN PATENT DOCUMENTS 3001620  9/1981  Germany ............................ 414/789.9

*Primary Examiner*—Dean J. Kramer
*Assistant Examiner*—Paul T. Chin
*Attorney, Agent, or Firm*—Walter K. Roloff; Robert A. Pajak

[57] ABSTRACT

An automatic library cart loading system includes a tilter for elevating a library cart at selected angle relative to a material placer. The placer is positioned in between a pair of library carts, and includes a pair of linear slide actuators for positioning a book rack along a selected shelf of a selected one of the pair of carts.

9 Claims, 12 Drawing Sheets

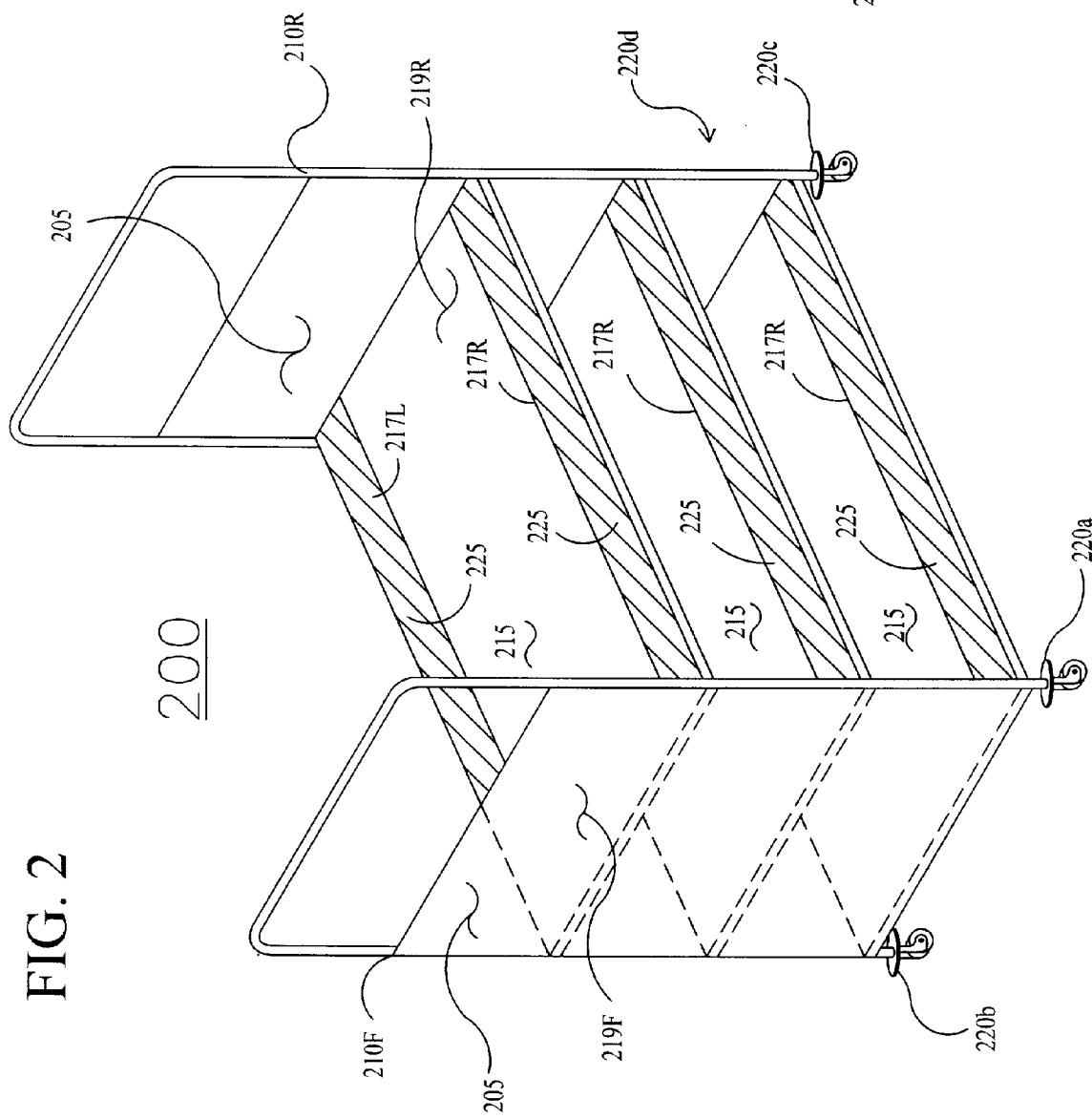
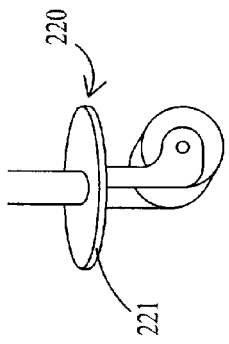

LIBRARY CART LOADING SYSTEM AND METHOD

FIELD OF THE INVENTION

The present invention relates generally to a system and method for automatically loading library carts, and specifically to a system and method for automatically placing library materials onto a selected shelf of a library cart.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever increasing volumes are often overwhelming.

Particularly problematic librarian tasks involve receiving, sorting, and ultimately re-shelving material returned from patrons. For example, these tasks, when manually performed by library personnel upon such ever-growing volumes of books and materials, greatly affect time required to repetitively collect and distribute each piece of material, i.e., "turn-around time" is negatively impacted. Manual performance of these tasks is known to lead to repetitive stress-type physical injuries. These injuries result, for example, from sorting and re-shelving tasks associated with repetitive grasping and positioning of each book or piece of material.

In attempts to minimize these problems, procedures have been developed to provide some degree of automation in such receiving, sorting, and re-shelving tasks. For example, librarians commonly employ wheeled carts, commonly known as "library carts," to transport library materials to be re-shelved. Each library cart usually has three shelves for holding materials in an upright manner, as they would appear on a library shelf. Nevertheless, general use of library carts, however, does not adequately address the aforementioned problems. The term cart, as used here-throughout, generally refers to those carts having shelves with open sides used in libraries and the like.

It should be further noted that valuable library staff time is consumed with selectively loading library carts for efficiency in performing re-shelving of the material. That is, typically a specific library cart is dedicated to returning material to a selected library area according to a library cataloging system. Such "dispatching" therefore efficiently directs each cart to only an area of the library selected to be served by the cart. By serving only a selected library area (i.e., library materials having specific cataloging identification) valuable library staff time is conserved by eliminating random travel throughout the library in random re-shelving. Of course, such selective library cart loading requires time investment from library staff in first determining where in the library certain material is to be re-shelved, then determining which cart is dedicated to that area, and then, finally, physically placing the material onto the particular dedicated library cart.

In general, attempts have been made to mechanically automate tasks of handling printed matter, and particularly books, thereby responding to problems associated with repetitive bending, grasping, and lifting and/or moving materials. For example, in automation pertaining to handling printed materials such as photocopies, U.S. Pat. No. 4,055,339 issued to Looney discloses a sorter apparatus to provide sorting or collating of copies. In U.S. Pat. No. 4,189,133 issued to Arrasmith, et al. a device is disclosed for automatically stacking continuous form documents on a table. U.S. Pat. No. 4,229,134 issued to Reist provides an apparatus for ejecting stacks of printed products from a receiver chute of a stacker device.

With regard to handling library materials, and books in particular, U.S. Pat. Nos. 3,640,407 and 3,776,404 issued to Anastasio, et al. disclose an apparatus for handling books that provides progressively formed book stacks to be removed to a delivery conveyor. U.S. Pat. No. 5,690,463 issued to Yoshie discloses an automated storage and retrieval system. Books handled in this system are required to be stored in barcode-addressed specialized multi-book containers. Such containers must be made an integral part of a library within which the system operates. Consequently, implementation of such a specialized system tends to increase library costs.

The aforedescribed patents however do not adequately address, for instance, the final re-shelving or "back-end" library circulation problem of automatically loading library books onto commonly used standard library carts, both in terms of physically loading such carts, and in performing the selective cart and shelf loading operation.

An important consideration in the design of a library cart loading system is noise. Therefore there is a need for library cart loading systems with relatively low noise or unwanted audible sounds while in operation.

Thus, there exists a need for a library cart loading system that performs the task of automatically loading library materials onto a library cart for ease of re-shelving. A need exists for these functions to be performed without holding the material in specialized containers, and in a quiet manner.

SUMMARY OF THE INVENTION

An object of the present invention is to provide a library cart loading system and method that automatically performs tasks of receiving and placing on library carts library material returned from patrons.

Another object of the present invention is to provide a library cart loading system and method that does not require use of specialized containers within the library.

A further object of the present invention is to provide a library cart loading system and method that is quiet in operation.

A yet further object of the present invention is to provide a library cart loading system and method that functions with use of common or industry-standard library carts.

In accordance with the present invention, a library cart loading system and method for selectively placing library materials on a library cart includes a library cart tilting means for receiving a library cart. The cart tilting means then acts to tilt, or raise an end of, the library cart such that shelves of the library cart are at a selected angle relative to a ground plane, i.e., the floor. A library material placer means is adapted for receiving a singular library material item, e.g., a book. The library material placer means is positioned relative to the tilting means so as to be controllably operated to successively place singular book-like materials onto a selected one of the shelves of the library cart while the cart shelves are at the selected angle relative to the ground plane. In the preferred embodiment of the invention, the cart is tilted so that the shelves are at a 15 degree angle relative to horizontal or the ground plane, or 75 degrees from vertical.

BRIEF DESCRIPTION OF THE DRAWINGS

FIG. 2 is a perspective illustration of a library book cart constructed in accordance with the present invention, and depicting an empty or at rest condition.

FIG. 2a is a perspective illustration of a caster wheel assembly of FIG. 2.

DETAILED DESCRIPTION OF THE INVENTION

Figure 3:
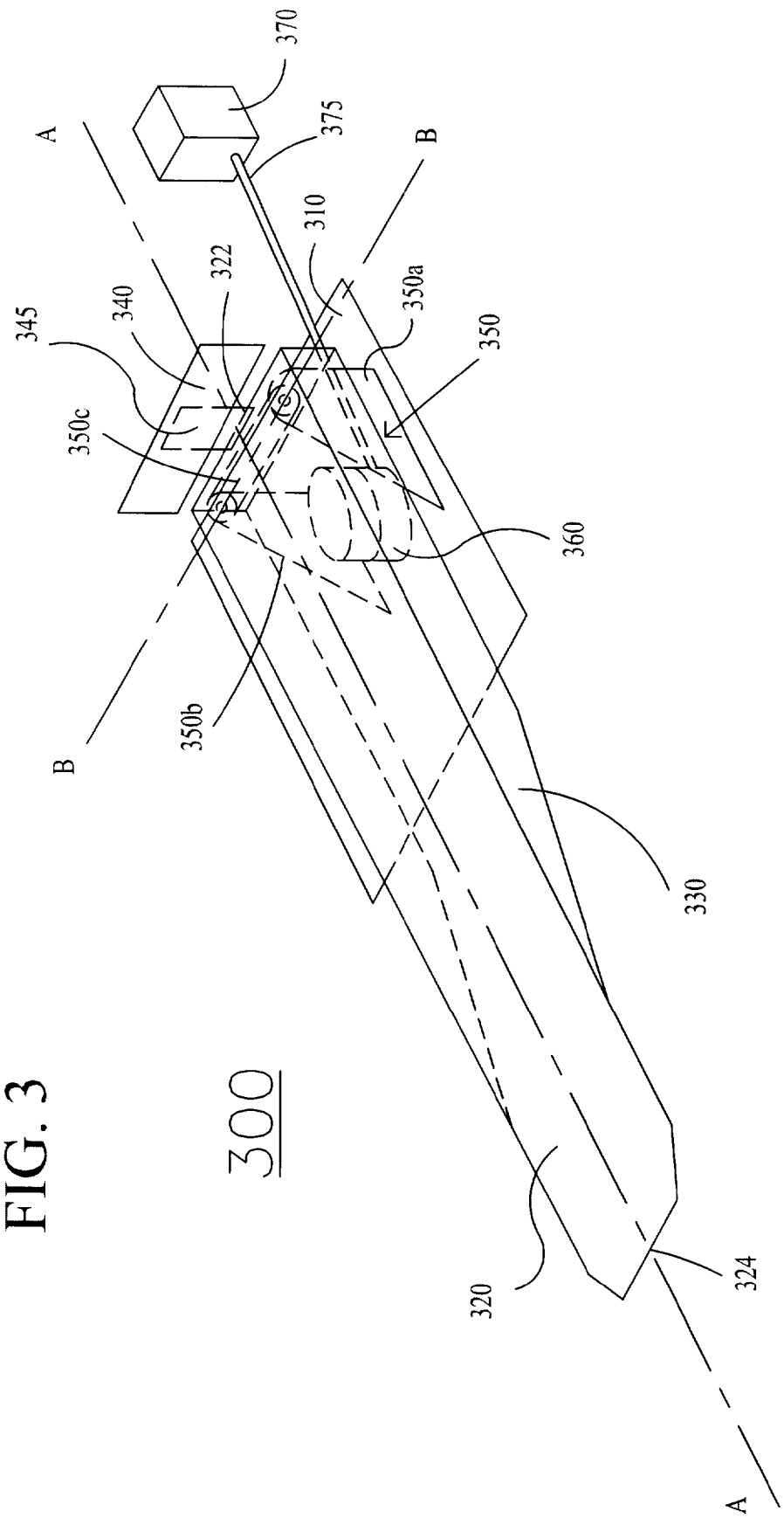
FIG. 3 is a perspective illustration of a library book cart tilting means constructed in accordance with the present invention, and depicting an empty or at rest condition.
Figure 4:
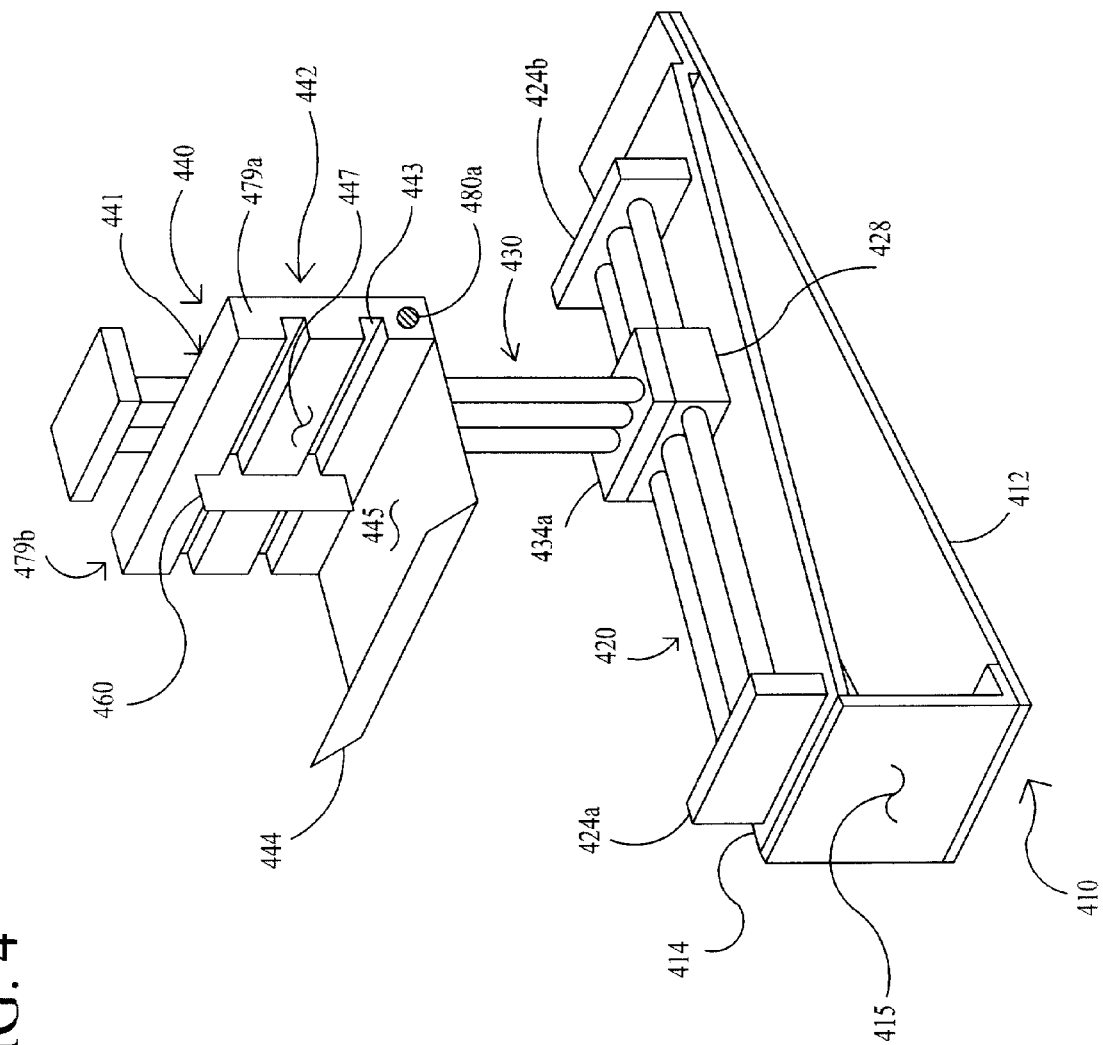
FIG. 4 is a perspective illustration of a library material placer means constructed in accordance with the present invention, and depicting an empty or at rest condition.

Referring to FIGS. 1, 2, 3, and 4, thereshown are perspective illustrations of components of the library-cart loading system of the present invention, both in combination as a part of an overall library material handling system (FIG. 1), and as individual components of the system (FIGS. 2–4). In these figures, library cart loading system 100 includes library book cart 200 (hereinafter, "cart 200"), library book cart tilting means 300 (hereinafter, "tilter 300"), and library material placer means 400 (hereinafter, "placer 400") with each being illustrated in transparent schematic fashion so that inner details may be readily ascertained, as will now be described.

In the following exposition, the words "book" and "material" as used herein are synonymous, and are intended to include any conventional library material such as, but not limited to, a bound book, a "paperback" book, a materials container (such as a magazine series receptacle or holder), a diskette cassette, a video tape, or any other tangible media that may have dimensions or an appearance similar or analogous to a conventional book. Further, it should be noted that books having dimensions in excess of 12" by 15" by 3" are generally considered to be folio, oversize, or jumbo books. Although library cart loading system 100 and its components may be able to accommodate such oversized library materials, standard library carts are not suited to handle such books. Therefore, specialized carts, if desired, may be employed, or the library handling material system may require special procedures as will be described below.

Figure 1:
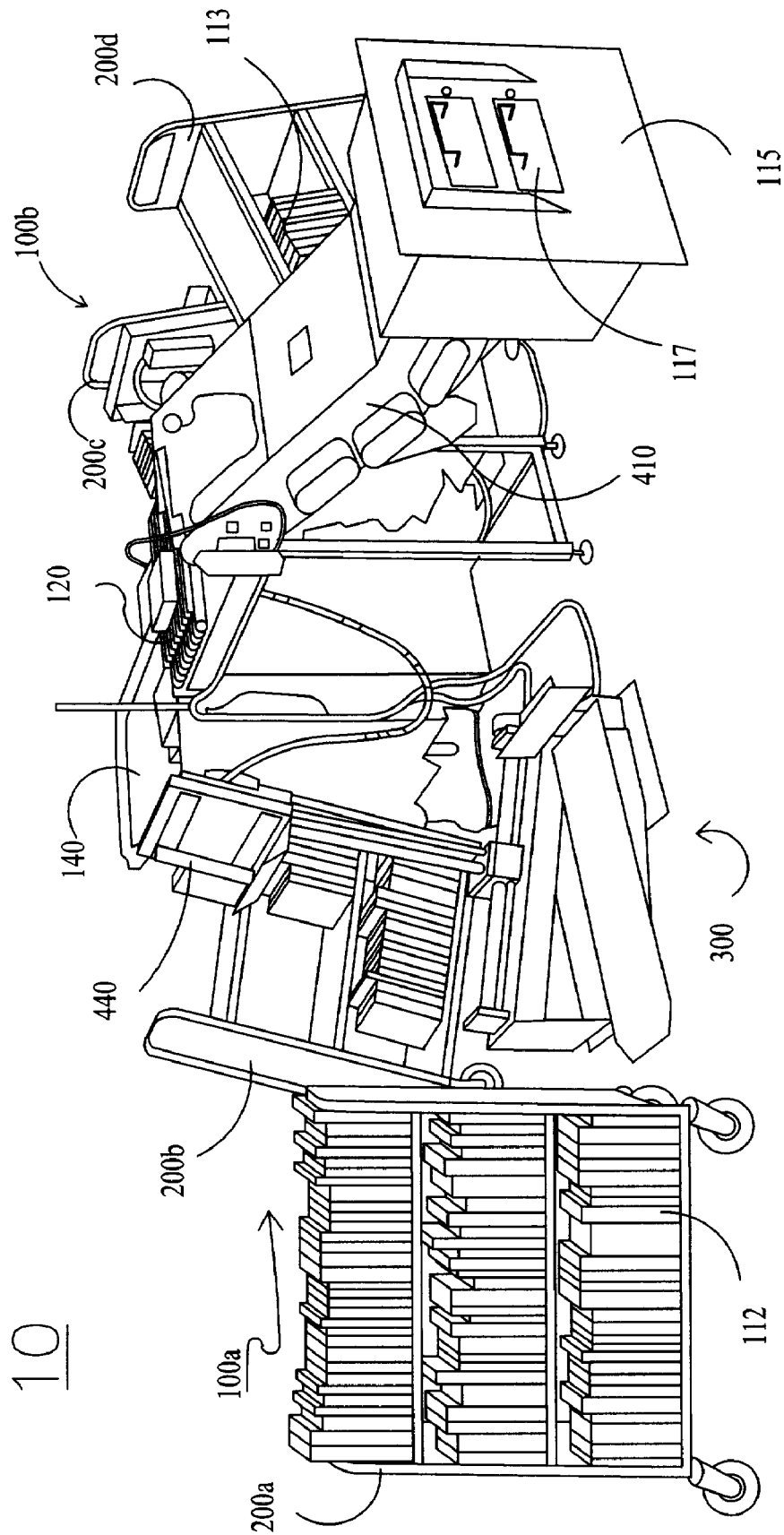
FIG. 1 is a perspective illustration of a library material handling system including the cart loading system of the present invention.

Illustrated in FIG. 1 is a library material handling system 10 incorporating the library cart loading system of the present invention generally shown as cart loading stations 100a and 100b. Each cart loading station 100a–b includes a tilter 300 and a placer 400 including a book rack assembly 440.

Thereshown in FIG. 1 are a plurality of library carts 200a–d, each constructed with 3 shelves for stacking books 112 cover-end to cover-end, with their spines perpendicular to top surfaces of, and facing outwardly from, the shelves. Books 112 may be stacked on both sides of the shelves as particularly depicted by numeral 113 associated with cart 200d.

A library material depository 115 with pullout drawers 117 receives library materials which are placed on a book transport system (not shown) for successively transporting the materials onto a materials processing station generally identified by numeral 120.

Materials processing station 120 is intended to transport an incoming item of library material onto a rack associated either with one of the cart loading stations 100a–b, or transport the item so as to be deposited into a receiving bin generally identified by numeral 140. More specifically, materials processing station 120 is intended to (i) square the incoming library materials for subsequent reading of a bar code associated with each library material item, (ii) selectively orient the material depending upon cart loading stations 100a or 100b to which the item is intended to be directed and onto which of the carts 200a–d the item is intended to be loaded, and (iii) transport the item to a specific book rack assembly 440 associated with each of the cart loading stations 100a–b.

Although not shown, additional cart loading stations may be provided so that each of the carts may be loaded from both sides at the same time. Further, a control system is intended to be incorporated for reading a bar code or other machine readable identifying label affixed to the material to direct the material to a selected shelf on a selected cart. Accordingly, each of the carts may be selectively loaded with like-kind materials according to a particular library cataloging system, and each shelf of each cart may likewise be loaded with like-kind materials.

Referring now to FIG. 2, there is illustrated a perspective view of cart 200 constructed in accordance with the present invention. Cart 200 is preferably a commercially available industry-standard three-shelf steel cart such as that available from Highsmith, Inc., of Fort Atkinson, Wis. Briefly, cart 200 generally includes a rectangular box-like frame 205, having vertical side brace members 210 that each include top and bottom ends, horizontal shelves 215, and cart wheel caster assemblies 220.

Each horizontal shelf 215 includes (i) peripheral opposing parallel longitudinal side members 217L and 217R (left and right side, respectively), defined as extending inwardly about 2 inches from an edge of each shelf 215 along the lengths thereof. Further, each of the shelves has opposing parallel widthwise end members 219F and 219R (front and rearward, respectively) attached to vertical side brace members 210F and 210R (front and rearward, respectively). Vertical side brace members 210 and horizontal shelves 215 may be joined or fastened together to achieve the rectangular box-like shape of cart 200, in any suitable manner, such as, for example, welding or riveting. Such joining or fastening results in corner junctions between these members.

Cart 200 further includes single cart wheel caster assemblies located at each bottom corner junction, e.g., the corners of the lowest shelf 215 with bottom ends of vertical side brace members 210. Each of the cart wheel assemblies 220 may generally include a post-like protrusion extending upwardly therefrom for conventional attachment to the aforesaid bottom corner junctions.

FIG. 2a is perspective of caster wheel assembly 220 of FIG. 2. Further included in each cart wheel assembly 220 is a conventional bearing housing or "caster collar" 221 that provides castering action between a wheel of the wheel assembly and the post-like protrusion attached to the bottom corner junction. These aforedescribed non-illustrated components of wheel assemblies 220 are conventional and known to those skilled in making or using wheeled carts.

Standard library carts have known dimensional spacing relationships of all components thereof. In particular, known spacing relationships exist between the length and width of a cart and its corresponding shelves, as well as between cart wheel assembles 220a–d (220d is not shown). More particularly, the dimensional relationships of the opposing bottom corner junctions of each vertical side brace member 210F and 210R are known and held to a controlled tolerance. Common library carts have an inside dimension spacing of about 11.5" between caster collars 221 of wheel assembly 220 pairs, e.g. wheel assemblies 220a and 220b.

Cart 200, in accordance with the present invention, further includes retro-reflective tape 225 bondably affixed to each longitudinal shelf side members 217L and 217R, lengthwise along horizontal shelves 215. Preferably, retro-reflective tape 225 may be a 2" wide 3M reflective tape having part no. 3M-2000X, and marketed as being 3000 times brighter than white. Such retro-reflective tape 225 includes an adhesive backing that enables it to be so affixed to longitudinal shelf side members 217.

Referring now to FIG. 3, there is illustrated a perspective view of tilter 300. Tilter 300 includes a floor mounting base 310, a cart blade or fork member 320, a cart fork support member 330, a vertical backstop 340, a pivot hinge assembly 350, a lifting air spring 360, and an air spring inflation means 370.

In accordance with the present invention, floor mounting base 310 is intended to be securely fastened to a floor surface (not illustrated). Such fastening of floor mounting base 310 to the floor surface may be accomplished by any variety of suitable fastening means (not illustrated) such as, for example, by use of floor anchor bolts that rigidly and planarly join or secure mounting base 310 to the floor surface.

Cart fork member 320 is preferably constructed from a sheet of UHMW plastic, having a thickness of about 0.5". In construction of cart fork member 320, the UHMW plastic sheet is fashioned into a generally rectangular or fork-like member of an average width of 11.5" and a length of about 36". For purposes of further disclosure below, a longitudinal reference axis A—A is identified along a lengthwise centerline of cart fork member 320 that terminates at opposing inboard end member 322 and outboard end member 324, thereof. Outboard end member 324 of cart fork member 320 is further fashioned to a taper or width narrowing symmetrical about longitudinal reference axis A—A, so that a cart 200 may be received or "funneled" thereupon. Specifically, such a symmetrical tapering of outboard end member 324 results in a width narrowing to about 7", from the aforesaid 11.5" average width of cart fork member 320.

The 11.5" average width of cart fork member 320 is specifically selected to accommodate interior spacing between the aforesaid caster collars of cart wheel assemblies 220. That is, the cart fork is intended to slip fit longitudinally between the known interior spacing between the caster collars of the pair of caster wheels associated with vertical side brace member 210F, and caster collars of the pair of caster wheels associated with vertical side brace member 210R. The selected cart fork member 320 width of 11.5" is intended to provide minimal unwanted transverse movement or "slop" between cart fork member 320 and cart 200 upon loading of cart 200 onto cart fork member 320. As a result, with the longitudinal passing through, and perpendicularity to, the widthwise end members of shelves 215, the shelves 215 are in good alignment with the A—A axis of cart fork member 320.

Again referring to FIG. 3, vertical backstop 340 may be fashioned from 0.75" thick UHMW plastic sheet material into a generally rectangular shape, having a vertical rise of 4" and a width of 15". Vertical backstop 340 is rigidly attached to a rearward portion of cart fork support member 330, generally perpendicular to reference axis A—A. Such rigid attachment of vertical backstop 340 to cart fork support member 330 is accomplished by use of an intermediary backstop plate 345 and suitable fasteners (not illustrated). Such fasteners rigidly join vertical backstop 340 to backstop plate 345, and in turn, also join backstop plate 345 to cart fork support member 330. Backstop plate 345 is preferably fabricated from hot-rolled sheet steel having an average thickness of 0.25". In this assembled arrangement of cart fork member 320, cart fork support member 330, and vertical backstop 340, the cart fork member 330 has a resulting overall L-shaped appearance.

Further illustrated in FIG. 3 is a pivot hinge assembly 350 connectedly incorporated near inboard end member 322 of fork member 320, cart fork support member 330, vertical backstop 340, and mounting base 310. Pivot hinge assembly 350 includes side brace members 350a–b and a hinge 350c having an axis of rotation generally about a reference axis depicted in the drawing as B—B which is in perpendicular alignment relative to axis A—A. Side brace members 350a–b are securely mounted or joined to floor mounting base 310 in a spaced-apart relationship on floor mounting base 310, and generally parallel to reference axis A—A of cart fork member 320. Hinge 350c is disposed between side brace members 350a–b, generally transversely to reference axis A—A and beneath cart fork member 320.

With pivot hinge assembly 350 thus constructed, cart fork support member 330 and cart fork member 320 are together capable of pivoting about axis B—B relative to floor mounting base 310. Specifically, in this arrangement of pivot hinge assembly 350, outboard end member 324 is capable of being raised relative to inboard end member 322 about reference axis B—B so that fork member 320 is at a selected angle relative to a ground plane upon which tilter 300 rests. In the preferred embodiment of the invention, the intended selected angle is 15 degrees relative to horizontal, as will be further described.

Tilter 300 further includes a lifting air spring 360 for raising outboard end member 324 relative to inboard end member 322, generally rotating about axis B—B. Lifting air spring 360 is preferably a commercially available Firestone air spring (such as that utilized as a heavy vehicle shock absorber) having a 6" diameter and a 1200 lb. capacity. Lifting air spring 360 is preferably positioned under cart fork support member 330 in between outboard end member 324 and inboard end member 322, and at the same time in proximity to hinge 350. With this arrangement, lifting air spring 360 is capable of selected inflation or deflation by way of air spring inflation means 370 so as to raise and lower fork member 320 with resultant rotation about axis B—B of hinge 350 upon command.

Air spring inflation means 370 provides both inflation and deflation of lifting air spring 360. In providing inflation, air spring inflation means 370 generates and introduces air into lifting air spring 360 through air supply line 375. During such inflation, high pressure air produced by air spring inflation means 370 is conducted to an interior chamber of lifting air spring 360 through air supply line 375. Upon full inflation of lifting air spring 360, air spring inflation means 370 shuts off. Upon desired deflation of lifting air spring 360, air spring inflation means 370 allows air to be vented.

The operation of tilter 300 will now be described. A library cart 200 is generally positioned so that outboard end member 324 of fork member 320 is initially positioned between a pair of caster wheels 220. Cart 200 is then pushed forward onto fork member 320 until it reaches vertical backstop 340. In turn, inflation means 370 is initiated by a command signal to begin inflating air spring 360. Fork member 320, being acted upon by air spring 360, in turn raises cart 200 until cart shelves 215 are at a selected angle relative to ground. By way of a limit switch (not shown), inflation means 370 stops inflating and cart 200 remains in the raised or elevated position. Upon another command signal to deflate air spring 360, inflation means 370 permits air to vented from air spring 360 until cart wheel assemblies rest on the floor, permitting cart 200 to be removed from tilter 300.

Figure 5:
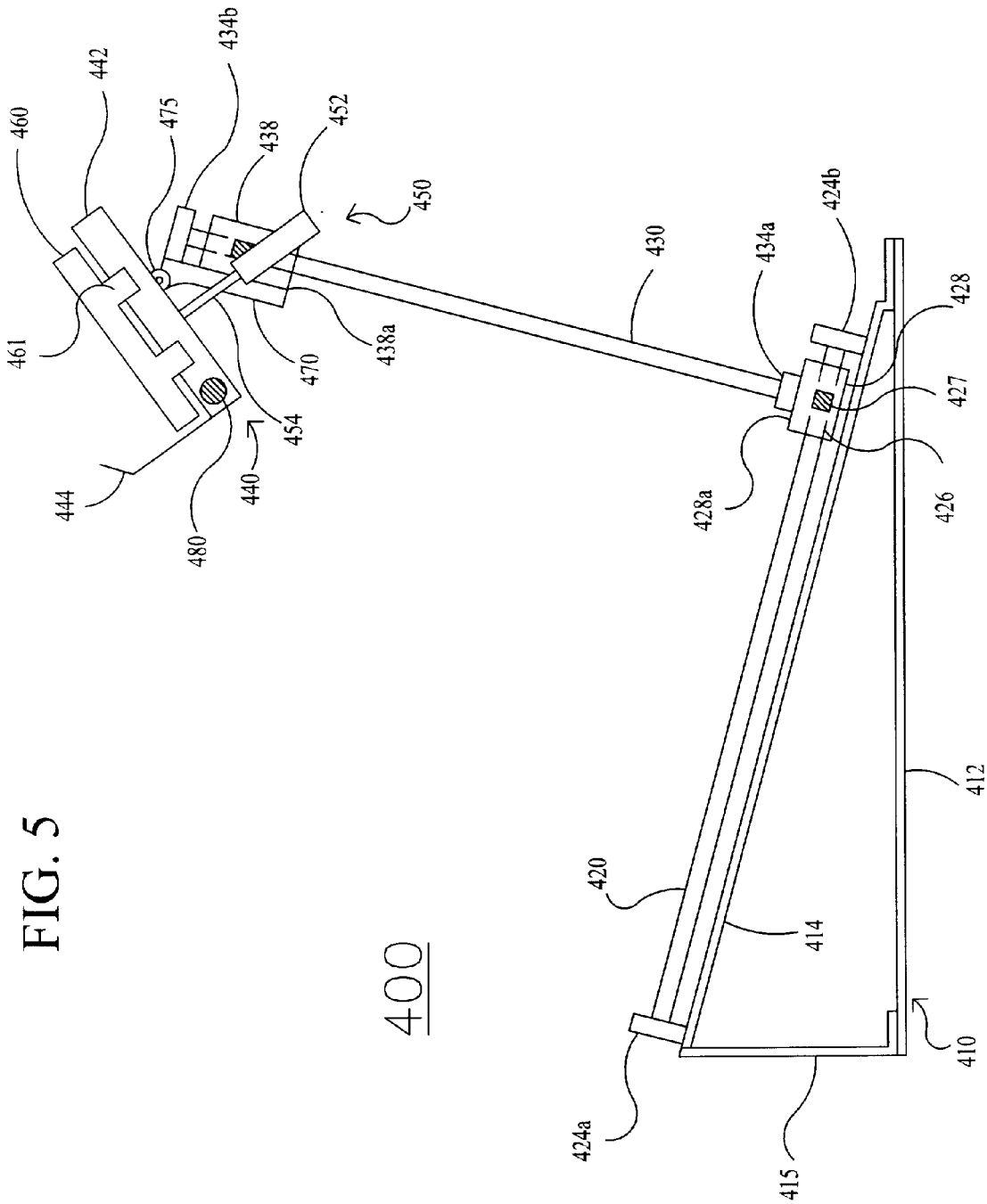
FIG. 5 is a side view illustration of a library material placer means depicted in FIG. 4 and constructed in accordance with the present invention.

Referring now to FIGS. 4 and 5, there is illustrated, respectively, perspective and side views of placer 400. Placer 400 includes a base 410 having a generally right-triangle side view appearance, a forward linear transport slide 420, an upward linear transport slide 430, a book rack assembly 440, a book rack assembly angle adjustment means 450, and a pusher bar 460.

Base 410 is preferably fabricated into the aforesaid right triangle shape from hot-rolled sheet steel having a thickness of 0.5". Base 410 includes a bottom member 412, an upward riser member 415, and a angled top member 414. Bottom member 412 includes floor mounting holes (not shown) to accommodate floor anchoring fasteners (also not shown) to anchor bottom member 412 securely to the aforementioned library floor surface in proximity to the aforedescribed floor mounting base 310 of tilter 300. Top member 414 is illustrated as forming a "hypotenuse" of the triangular arrangement of bottom member 412, top member 414, and riser member 415.

Placer 400 includes a forward linear transport slide 420 coupled to a transverse upward linear transport slide 430. As will subsequently be described, placer 400 is capable of transporting a book rack assembly 440 in orthogonal directions, referred herein as forward and upward directions relative to each other.

Figure 6:
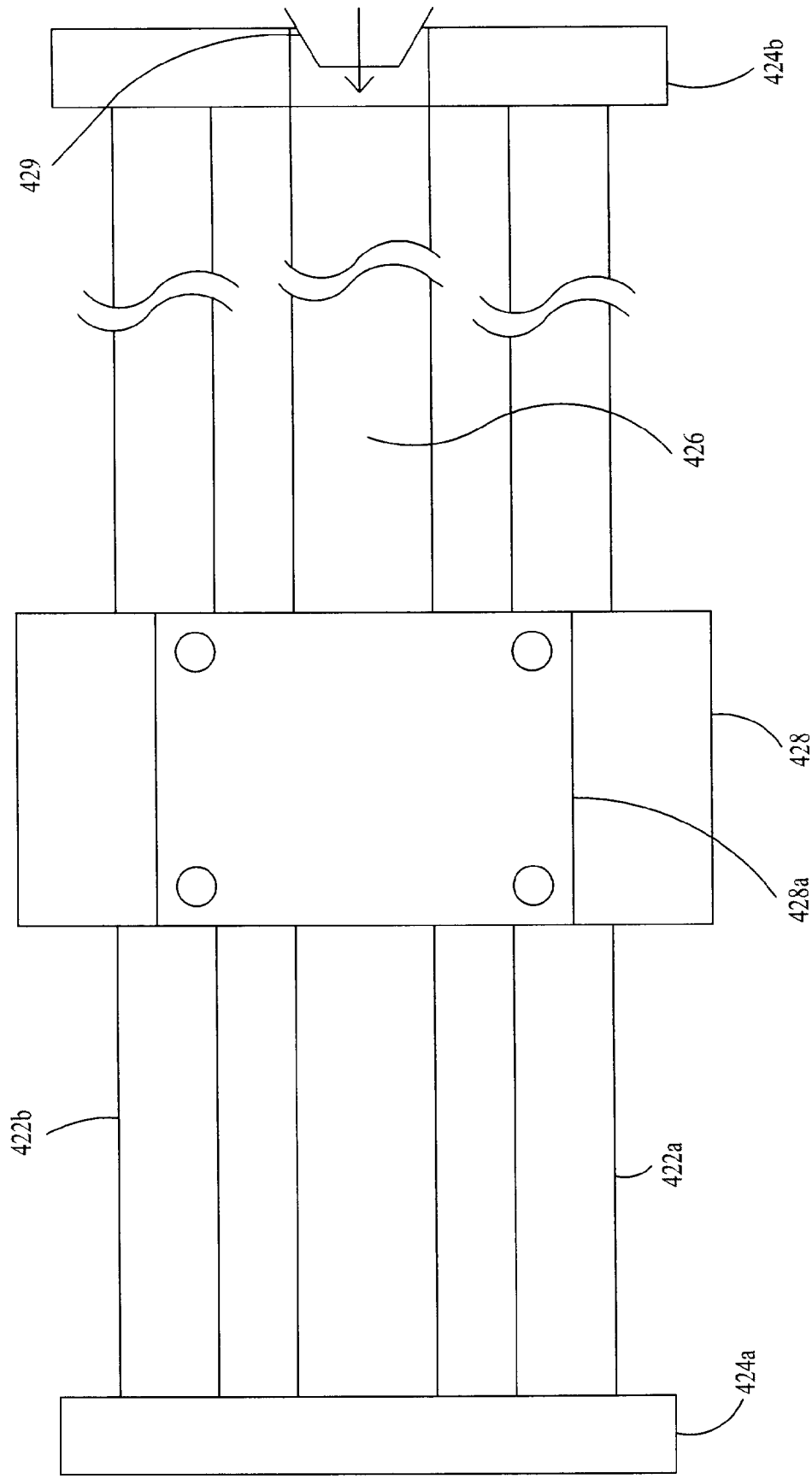
FIG. 6 is a top view illustration of a component of the library material placer means of FIGS. 4 and 5.

Forward linear transport slide 420 is attached to top member 414 of base 410. With particular reference to FIG. 6, forward linear transport slide 420 is shown in detail as preferably a commercially available Bimba "Ultran-Series" rodless air-operated linear slide having a 27" stroke and a 1.5" bore. Such an air-operated forward linear transport slide 420 includes an outside parallel pair of hard chrome plated carbon steel guide rods 422*a–b*. One end of each of the guide rods 422*a–b* is secured in place to end block 424*a*, and the other ends thereof are secured in place to end block 424*b*. Air-operated forward linear transport slide 420 further includes a center stainless steel piston tube body 426 containing an air-actuated piston 427 therewithin (illustrated in FIG. 5), an end air orifice 429 in communication with an interior of piston tube body 426, and a carriage 428 having a top mounting surface 428*a*. Carriage 428 is magnetically coupled to piston 427 within piston tube body 426.

It will be appreciated by those skilled in the art that piston 427 within piston tube body 426, upon receiving sufficient air pressure thereupon introduced through end air orifice 429, will move in response to such air pressure within an interior length of piston tube body 426. Further, such movement of the piston will cause carriage 428, being magnetically coupled thereto, to responsively move longitudinally in parallel with the hypotenuse angled top member 414.

Returning now to FIGS. 4 and 5, upward linear transport slide 430 is preferably a Bimba device that is similar to forward linear transport slide 420 as aforedescribed in detail with reference to FIG. 6. In construction of placer 400, upward linear transport slide 430 is rigidly attached to carriage 428 of base linear slide 420. Specifically, end block 434*a* is securely mounted to top mounting surface 428*a* of carriage 428. As identified in the drawing, upward linear transport slide 430 includes a slidable carriage 438, which like carriage 428, may be slidably positioned along the slide by air pressure.

In FIG. 4, the position of carriage 428 is in a nearly "full back position", and position of carriage 428 is in a nearly "full up position". It should be appreciated that the mounting arrangement of forward linear transport slide 420 and upward linear transport slide 430 is such that upon air actuation of piston 427 within forward linear transport slide 420, carriage 428 is capable of moving linearly along guide rods 422*a–b* for a full tandem length thereof, and at the same time imparting linear motion to upward liner transport slide 430 and associated carriage 438. Further, upon air actuation of the piston within upward linear transport slide 430, carriage 438 is capable of moving linearly along guide rods 432*a–b* for a full tandem length thereof. Although not shown, limit switches are preferably incorporated with each slide 420 and 430 to cooperate with electromechanical air controls (not shown) so as to not forcibly cause damage to end blocks 424*a–b* and 434*a–b*.

Coupled to carriage 438 of upward linear transport slide 430 is a book rack assembly generally identified by numeral 440. Book rack assembly 440 is pivotally coupled to a mounting bracket 470 by way of hinge 475. Mounting bracket 470 is rigidly attached to a mounting surface 438*a* of carriage 438.

Book rack assembly angle adjustment means 450 includes an actuation cylinder 452 and an actuator rod 454. Actuation cylinder 452 is pivotally attached to mounting bracket 470, or alternatively to a side of carriage 438. Actuator rod 454 is responsively coupled to actuation cylinder 452 and projects outwardly therefrom, at one end. Actuator rod 454, at its opposite end, is rigidly attached to a rear portion of book rack assembly 440.

Book rack assembly angle adjustment means 450 is intended to be connected to an air supply (not shown) for controlling the action of actuator rod 454 so as to either selectively extend or retract actuator rod 454. A resultant motion of attached book rack assembly 440 is, respectively therefore, clockwise or counter-clockwise rotation about the axis of hinge member 475. Although not shown, the air supply is provided through an air control component known in the art responsive to a control signal (also not shown) so as to achieve the intended action upon command.

Book rack assembly 440 is illustrated in FIGS. 4 and 5 as including a rack member 442 having a slotted planar-like supporting surface 447, and a ledge member 444 having a ledge supporting surface 445. Slidably coupled to book rack assembly 440 is pusher bar 460. Slots 443 of slotted rack member 442 of book rack assembly 440 serve as a key-way so as to accept mating protrusions 461 from pusher bar 460. Pusher bar protrusions 461 and slots 443 assist in preventing thin printed matter such as single sheets of paper from becoming stuck or wedged between pusher bar 460 and the surfaces of rack member 441 and ledge 444 during operation.

Fixed to end 479*a* of rack member 442 is an optical transmitter/receiver 480*a*. Another optical transmitter/receiver 480*b* (not shown) is similarly fixed and arranged on end 479*b*. Each optical transmitter/receiver 480*a* and 480*b* is intended to serve as a sensor for sensing library materials on shelves 215 of carts 200. More specifically, each sensor 480 is intended to (i) direct light toward retro-reflected tape 225 of carts 200, and (ii) detect the presence or absence of reflected light therefrom.

Figure 12:
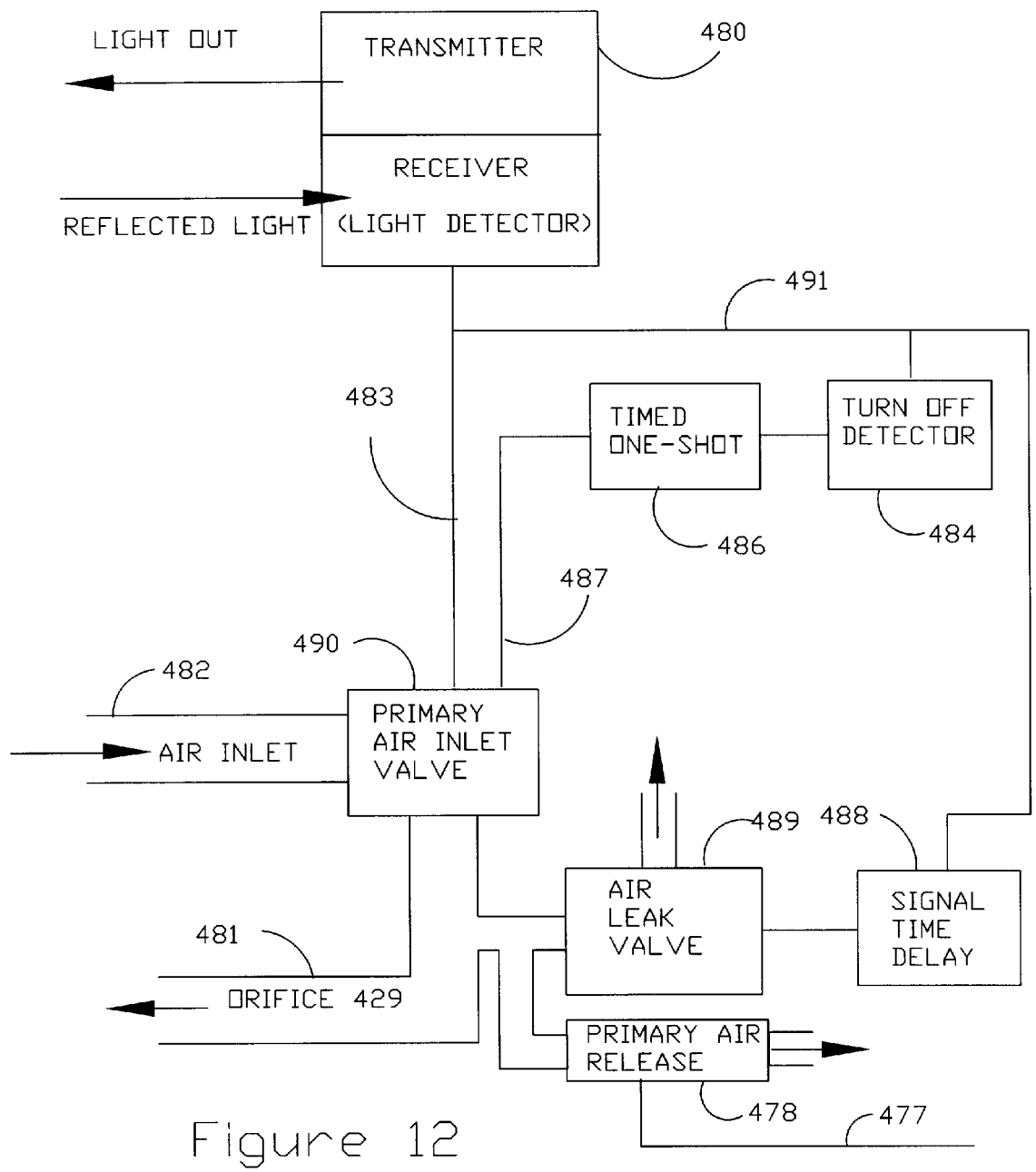
FIG. 12 is a block diagram of an electromechanical control system incorporated for operating the cart loading system of the present invention.

Each transmitter/receiver 480 is intended to provide a control signal along signal line 483 to control the operation of an electromechanical air valve 490 as particularly illustrated in FIG. 12. Referring to FIG. 12, upon an absence of detection of any light, valve 490 is open and allows air supplied to orifice 429 to pressurize forward linear transport slide 420 for resultant movement of carriage 428 away from the full back position. This movement is intended to continue until retro-reflected light is detected by the transmitter/receiver 480. Upon detection of light, the valve is closed, and, for the most part, forward motion of carriage 428 ceases.

However, the same control signal 483, which operates valve 490, also operates an air leak valve 489 through a signal time delay 488 for causing air to be vented from the same inlet side of orifice 429. Venting of air, of course, will cause carriage 428 to incrementally return toward the full back position. A turn off detector 484 detects a condition of an instant when receiver 480 detects light and subsequently turns off primary valve 490. This causes a timed-one shot 486 to once again turn on primary valve 490 for a predetermined controlled burst of air to cause a selected incremental forward movement of carriage 428. The latter, as will be subsequently appreciated, permits loading of new materials onto cart 200 without hitting or interfering with those already on the cart. In order to return carriage 428 to the standby or full back position, a primary air release 478 is actuated by a manual or automatic control signal 477.

In the preferred operation of the cart loading system of the present invention, a single placer 400 is intended to be positioned between two tilters 300. This is particularly illustrated in FIG. 1, where placer 400 and associated book rack assembly 440 may load library materials onto carts 200*c* and 200*d*. Therefore, each book rack assembly 440 preferably includes two transmitter/receivers 480*a* and 480*b* for communication with retro-reflected tape 225 on shelves 215 of carts 220 on opposite sides of placer 400. Attachment of each transmitter/receiver 480 onto book rack assembly 440 may be accomplished by a wide array of attachment schemes including simply bolting it onto book rack assembly 440.

It should be noted that the position of each transmitter/receiver 480 is critical for proper functioning of an automatic loading operation of a cart 200. In accordance with the present invention, tilter 300 and placer 400 must be properly arranged relative to each other so that (i) forward motion of book rack assembly 440 by way of forward linear transport slide 320, and (ii) the "held" position of carriage 438 of upward linear transport slide 430 relative to a selected shelf 215 for loading thereon, are each such that ledge supporting surface 445 is always sufficiently above the selected shelf 215 top surface so that there exists a line of sight between retro-reflective tape 225 and transmitter/receiver 480. With the arrangement as aforesaid, transmitter/receiver 480 is intended to communicate with retro-reflective tape 225 of cart 200 through (i) emission of infra-red light generated by transmitter/receiver 480 onto tape 225, and (ii) sensing reflection therefrom.

Figure 7:
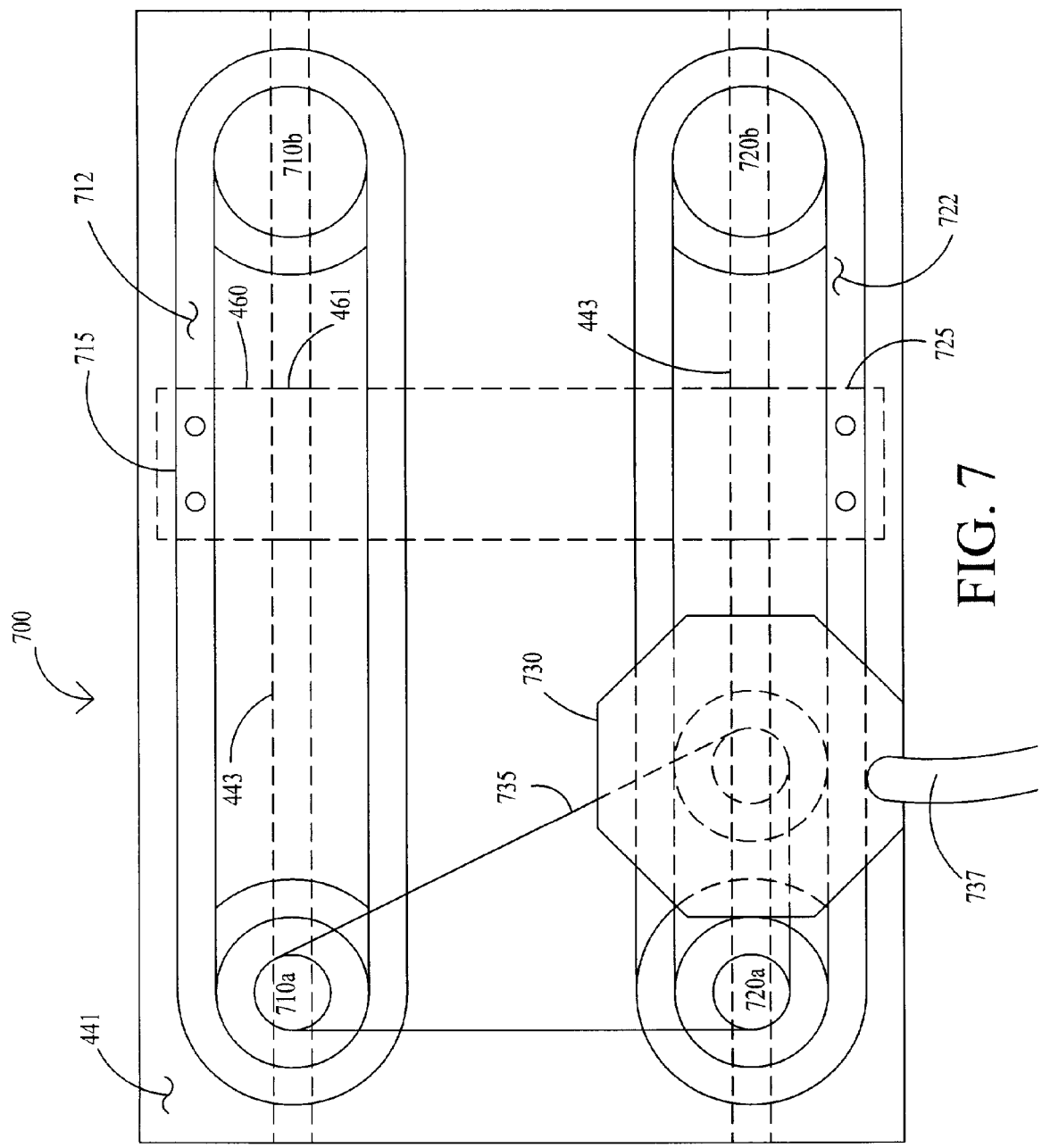
FIG. 7 is a diagrammatic representation of a driver mechanism for a pusher bar of the present invention.

Illustrated in FIG. 7 is a back side 441 of book rack assembly 440 generally illustrating an exemplary drive mechanism 700 for pusher bar 460. There shown are an upper chain and sprocket driver including a pair of sprockets 710*a* and 710*b* mounted to back side 441 of rack member 442, a chain drive 712 in drivable engagement with sprockets 710*a*–*b*, and an upper end of pusher bar 460 as indicated by numeral 715. A lower chain and sprocket driver includes a pair of sprockets 720*a* and 720*b* mounted to back side 441 of rack member 442, a chain drive 722 in drivable engagement with sprockets 720*a*–*b*, and a lower end of pusher bar 460 as indicated by numeral 725. A motor 730 is shown mounted to the backside of rack member 442, and is drivably engaged with both sprockets 710*a* and 710*b* by way of continuous chain 735. Motor control wiring is generally indicated by numeral 737.

Drive mechanism 700 is intended to move pusher bar 460 laterally across book rack support surface 447 so as to be capable of pushing library materials off of rack member 442 in either direction and onto an awaiting cart shelf in alignment therewith. As should be understood by those skilled in the art, drive mechanism 700 may be implemented by a wide array of techniques including bands instead of chain, as well as electromechanical air valve components and circuit components in order to achieve the intended function.

It should be noted, however, that when placer 400 is arranged between two carts 200*c* and 200*d*, similar to that illustrated in the FIG. 1, placer 400 needs to have advanced notice as to which cart a subsequently received item or book is intended to be loaded. This is so that pusher bar 460 may be positioned at one of opposing ends 479*a* or 479*b* of rack member 442 and appropriately move pusher bar 460 to cause an item to be pushed off rack member 442 to the left or to the right per the illustration.

Drive motor 730 is preferably a DC motor. Before receiving an item for loading, a control signal is applied to drive motor 730 to cause pusher bar 460 to be positioned to the right or to the left. Upon receiving an item for cart loading, and subsequent placement of the book rack assembly 440 relative to a selected shelf of a selected cart, drive motor 730 is operated to cause pusher bar 460 to sweep across surface 447 of rack member 442 to push the item off of the rack and onto a selected shelf 215 of a cart 200.

Figure 8:
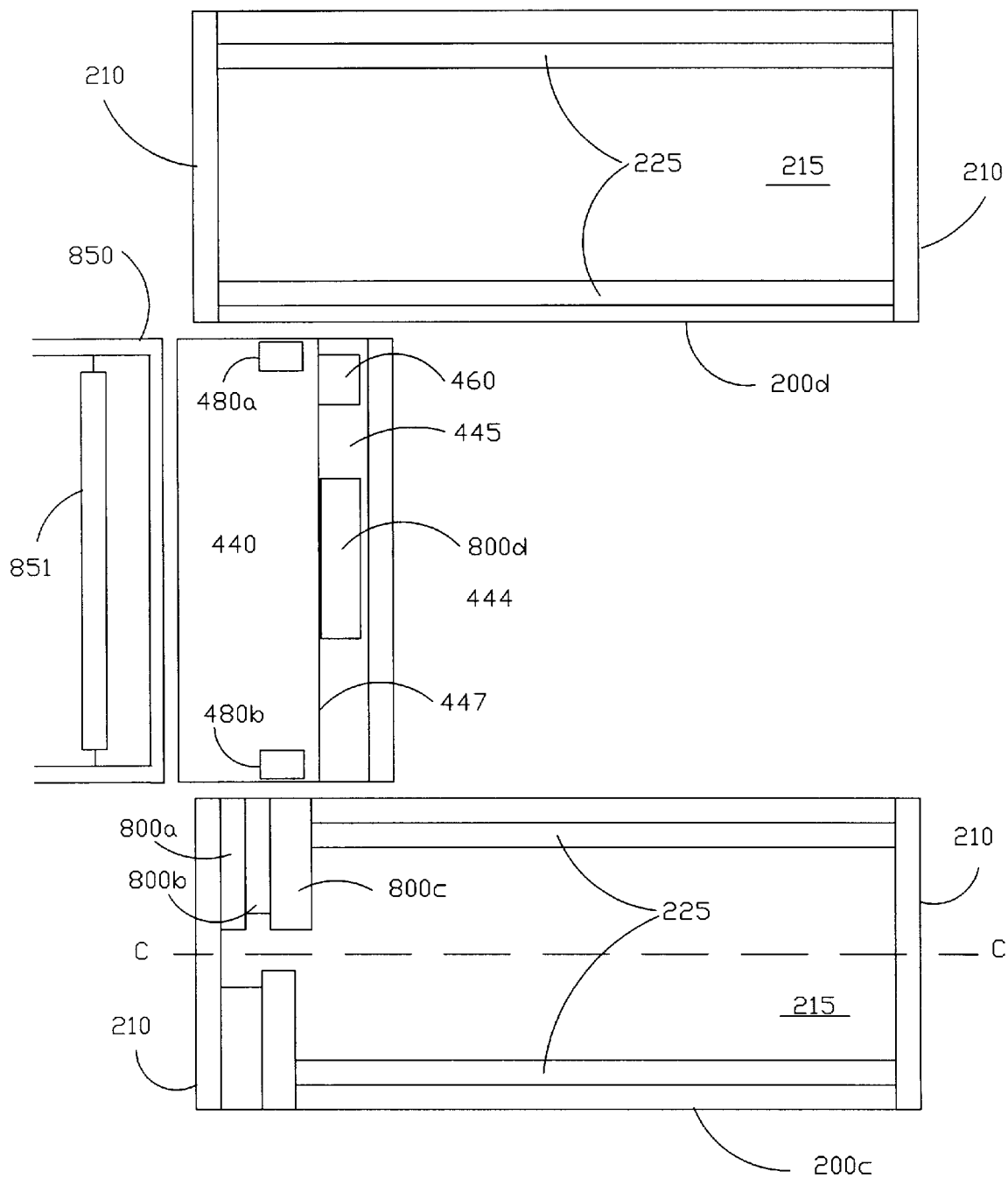
FIG. 8 is a partial top view illustrating the relationship of a placer book rack assembly and a cart.
Figure 9:
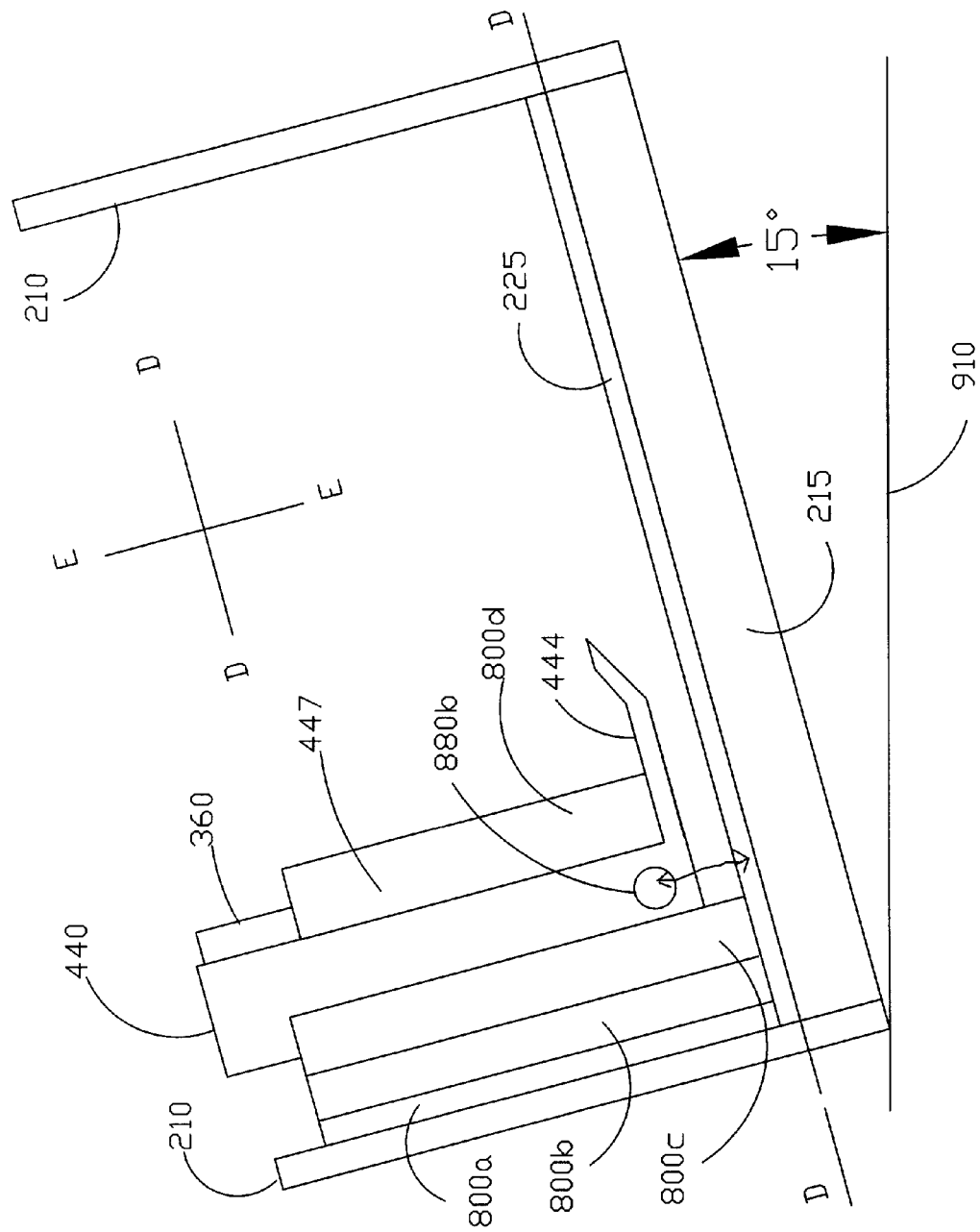
FIG. 9 is a partial side view illustrating the relationship of a placer book rack assembly and a single shelf of a cart.

FIG. 8 is a partial top view of the arrangement of a library cart loading system similar to that illustrated in FIG. 1 and identified as system 100*b*. FIG. 9 illustrates a partial side view from the view illustrated in FIG. 8 as viewed from the center of a shelf 215 along center line C—C. In FIGS. 8 and 9, similarly arranged components have retained the same numeral designations as that of FIG. 1. More specifically thereshown in FIG. 8 are library carts 200*c* and 200*d* with their top shelves 215 in view. Cart 200*d* is shown as being empty, and cart 200*c* is shown with books 800*a*–*d* standing upright with their spines facing outward from the shelf, and stacked cover-end to cover-end. Also shown is part of forward linear transport slide 420 for moving book rack assembly 440.

FIGS. 8 and 9 illustrate the situation before book 800d is loaded onto shelf 225. For exposition purposes, there is a longitudinal reference axis D—D passing through the surface plane of shelf 215, and a transverse reference axis E—E perpendicular to the plane of shelf 215.

The situation illustrated in FIG. 9 is the condition that the tilter 300 associated with a corresponding placer 400 has already received a cart 200, and elevated it so that shelf 215 and corresponding reference axis D—D are at a 15 degree angle relative to the ground plane or horizontal as numerically identified by numeral 910. As illustrated in this scenario, cart side brace members 210, books 800a–d, book supporting surface 447 of rack 440, and pusher bar 460 are all in parallel alignment.

Figure 10:
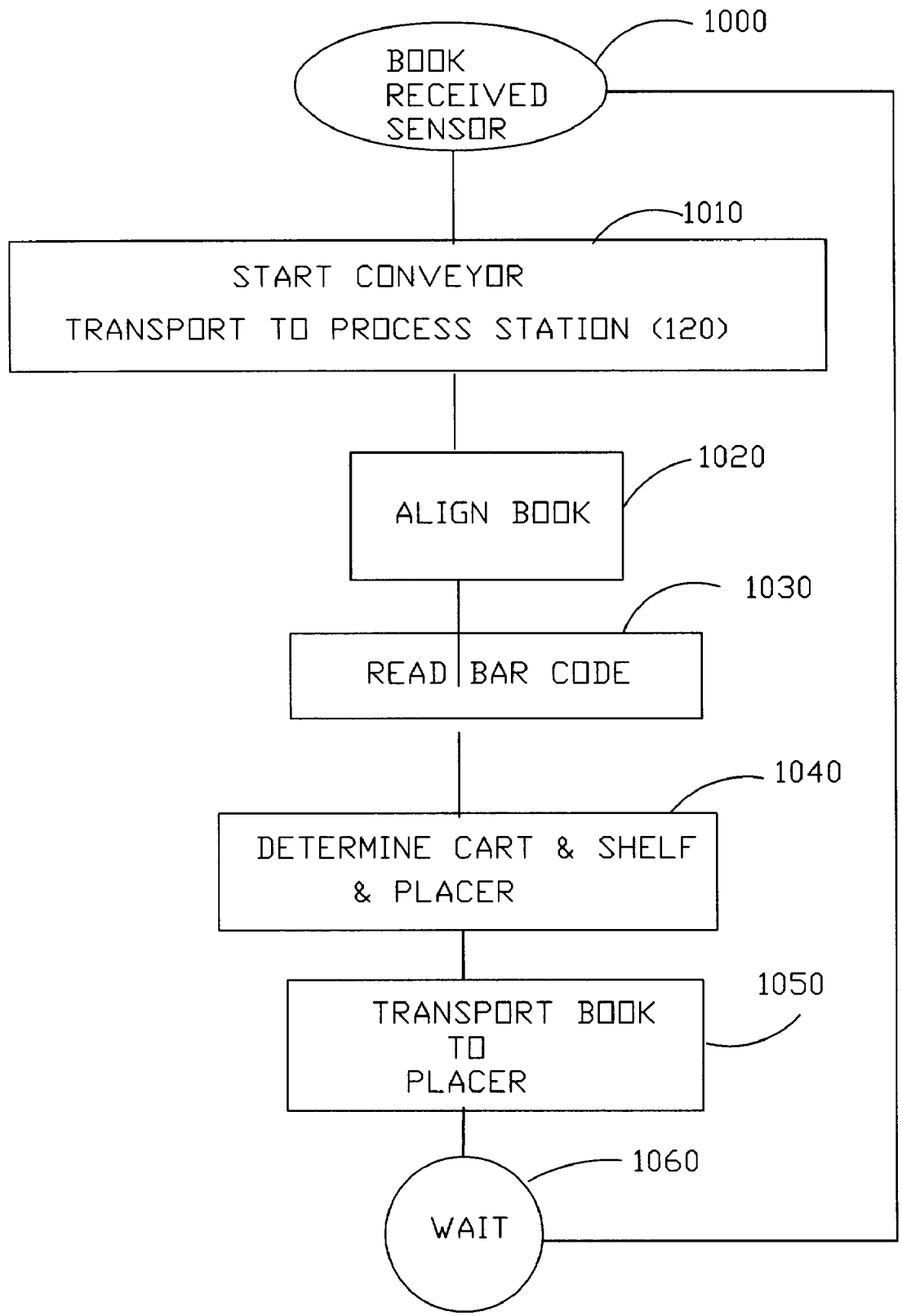
FIG. 10 is a flow diagram illustrating operation of the materials processing station of a library material handling system employing the cart loading system of the present invention.

FIG. 10 is a flow diagram illustrating a control system of a library material handling system employing the library cart loading system of the present invention. Referring to both FIGS. 1 and 10, a sensor or the like detects the deposit of a book or the like into library material depository 115. In turn, the conveyor is started (1010) so that the material is transported to a materials processing station for alignment by way of a conveying means such as motor driven rollers of a conveyor. In turn, the item is "squared" or aligned (1020) relative to an awaiting book rack assembly 440 of a placer 400, and the bar code associated therewith is read (1030). Based on the (i) library cataloging system and bar code, and (ii) the number of placers stations 400 and tilter-library cart stations incorporated into the library handling system, a determination (1040) is made as to (i) which cart the item should be loaded thereon, (ii) which shelf on the cart is to be so loaded, and (iii) which placer 400 station is associated with the determined cart. Subsequent to the loading location determination, the material is transported and conveyed to an awaiting book rack assembly 440. This receiving process then awaits for another item to be processed by the library materials processing station 120.

Figure 11:
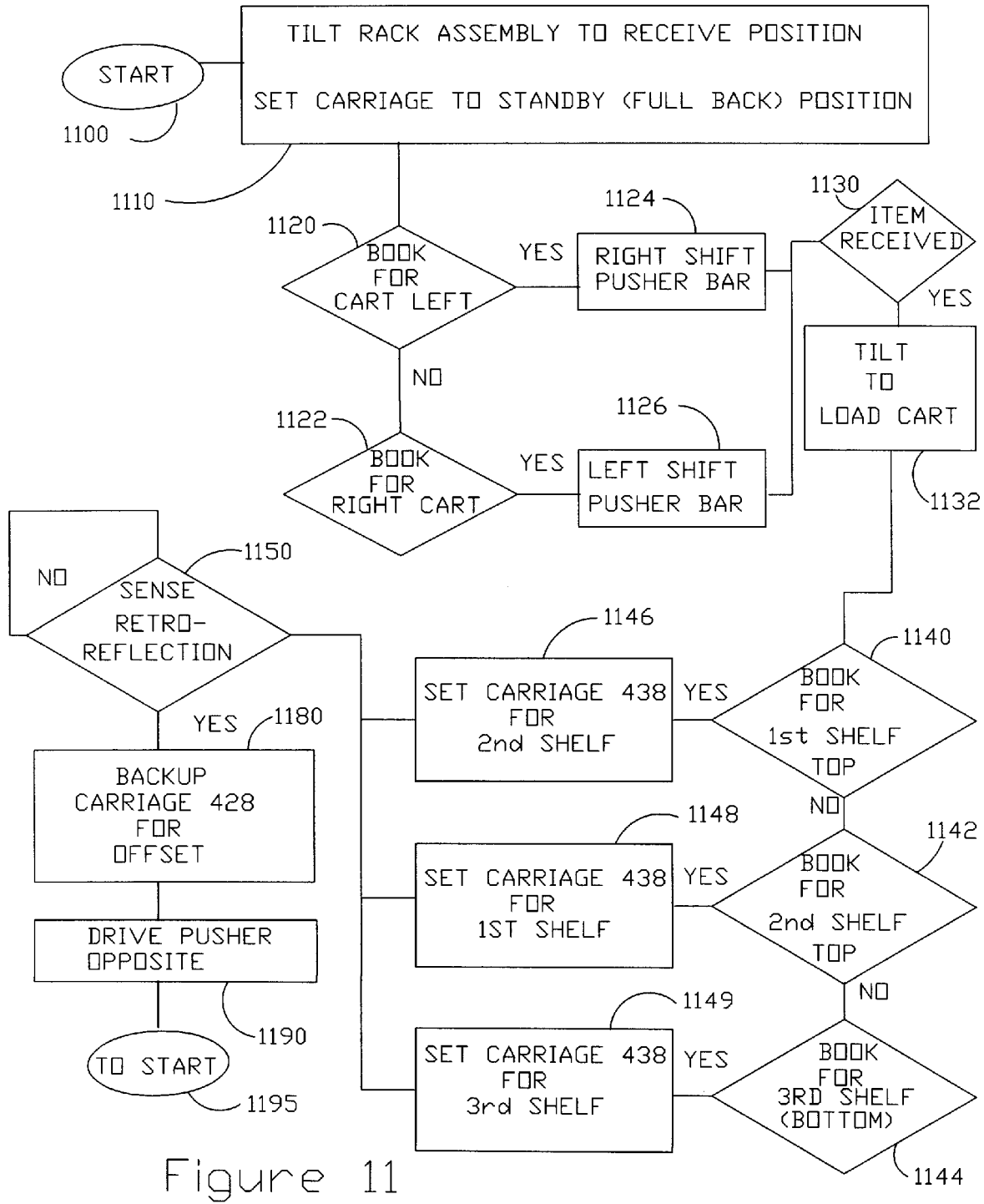
FIG. 11 is a flow diagram illustrating operation of the cart loading system of the present invention.

FIG. 11 is a flow diagram of a single placer station in cooperation with a library cart 200 on separate tilters 300 on each side of the placer station 400 as depicted in FIG. 8. A control system initiates (1100,1110) the placer 400 so that rack member 442 is at a "material receive position" so that it is properly positioned relative to an item of incoming material from materials processing station 120. This is accomplished by control of book rack assembly angle adjustment means 450 to cause the rack member to be closer to horizontal, but still tilting downward so that gravity will cause an item to slide toward ledge member 444 when an item is transported off of materials processing station 120. Further, carriage 428 of forward linear transport slide 420 is set to the full back or "receive" position, and carriage 438 of upward linear transport slide 430 is set to the full up or "receive" position.

The materials processing station 120 transfers the appropriate information to the particular placer 400 determined by materials processing station 120. In turn the corresponding pusher bar 460 of the appropriate book rack assembly 440 is shifted to the right or the left depending upon whether the item is to be loaded on the right or left cart, respectively, 1120, 1122, 1124, and 1126.

Upon detection of the designated received book 1130, the rack member 442 is tilted to a load position, 1132, by way of book rack assembly angle adjustment means 450. In turn, carriage 438 of upward linear transport slide 430 is set to the proper position for loading one of the shelves of the cart, 1140, 1142, 1144, 1146, and 1148. After setting of the position of carriage 438, the transmitter/receiver 480 is enabled for searching 1150 for an open or unoccupied space on the selected shelf. Once space has been found, assuming a limit sensor has not been enabled, carriage 428 is backed up to accommodate any offset between detection of the space and the actual planar surface 447 of rack member 442 so that the item cover surface is in approximate alignment plus a "safe tolerance space" beyond an item previously loaded on the cart. In turn, pusher bar 460 is actuated 1190 for pushing the item onto the cart.

The operation of the library cart loading system 100 will now described with reference to all of the Figures. First, if necessary, tilter 300 is returned to an at-rest condition by deflation of lifting air spring 360. In such an at-rest condition, cart fork member 320 is substantially horizontal with the library installation floor surface. A preferably empty cart 200 is then loaded or pushed onto cart fork member 320 by library personnel.

As aforedescribed, and as will be appreciated by reference to the drawings, cart 200 when being so loaded onto cart fork member 320 is basically "funneled" onto cart fork member 320. This funneling is achieved through, and by interplay between, tapered outboard end member 324 of cart fork member 320 to cart 200, and by the width of cart fork member 320 being just less than the spacing of cart wheel collars 221 on each frame member end of the cart.

Upon loading cart 200 onto tilter 300 and resting cart 200 against vertical back stop 340 of tilter 300, lifting air spring 360 is inflated. This may be accomplished by manually or automatically switching on inflation means 370 to inflate air spring 360. Automatic operation may be provided by way of activation of a limit switch by contact of cart 220 with vertical back stop 340.

Inflation of air spring 360 causes air spring 360 to push upwardly against and support cart fork member 320, thereby elevating outboard end member 324 relative to inboard end member 322 about axis B—B of pivot hinge assembly 350 as aforedescribed. In the preferred embodiment of the invention, maximum inflation of lifting air spring 360 causes cart fork member 320 to elevate so as to be at an angle of 15 degrees above horizontal.

In a standby condition, forward linear transport slide 420 is pneumatically controlled so that carriage 428 is in the full back position, and upward linear transport slide 430 is pneumatically controlled so that carriage 438 is in the full upward position. Further, pusher bar 460 re-sets to an at-rest or "home" position either full left or full right, and book rack assembly angle adjustment means 450 is in the book receiving position.

Upon receiving an item of material to be placed on cart 200, book rack assembly angle adjustment means 450 is operated to be placed in the load condition. In turn carriage 438 is adjusted so as to be in proper proximity to a shelf 215 of cart 220. After setting carriage 438, transmitter/receiver 480 becomes operative so as generate a beam of light that is continuously directed onto a portion of a horizontal cart shelf member 215 where reflective tape 225 is located. Since placer 400 is always operative starting from a full back position of carriage 428, the transmitter/receiver 480 will initially receive no light.

At the beginning of a loading cycle, transmitter/receiver 480 communicates with electromechanical air valve 490 which is in communication with end air orifice 429 of forward linear transport slide 420 causing it to open and allow supplied air to pressurize forward linear transport slide 420 for resultant movement of carriage 428 thereof as aforedescribed. In the beginning of the loading cycle, transmitter/receiver 480 receives no light. Accordingly, book rack assembly 440 moves forward as the aforesaid valve remains open in response to light continuing to not be received due to a lack of reflection from retro-reflective tape 225.

Carriage 428, and corresponding book rack assembly 440, will linearly move forward until retro-reflected light is ultimately received by transmitter/receiver 480 from exposed reflection from retro-reflective tape 225. Upon sensing the light, transmitter/receiver 480 provides a signal to valve 490 so that valve 490 closes and all movement of carriage ceases except for any overshoot and retraction and forward offset obtained by the arrangement of valves and controls as already described. In turn, pusher bar 460 is operated so as to push the material off of rack member 442 and onto cart shelf 215. After loading the material onto the cart, valve 490 is fully vented through primary air release 478, and placer 400 is allowed to return to the standby condition.

It should be noted that the library cart loading system is intended to be incorporated into any library material handling system generally incorporating a cataloging identifier associated with each specific item of library material. Therefore, it should be understood that the cart loading system is preferably controlled by a computerized control system such as a personal computer or the like. Although the operational control of the cart loading system has been described herein in simple control terms and concepts, it should be appreciated that more complex controls and systems for controlling the library cart loading system of the present invention are all within the true spirit and scope of the present invention as claimed herein.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

Lastly, the choice, of course, of mechanical sizes and strengths of various components are all a matter of design choice depending upon intended use and objects intended to be handled by the system of the present invention.

Accordingly, these and other various changes or modifications in form and detail of the present invention may also be made therein, again without departing from the true spirit and scope of the invention as defined by the appended claims.

What is claimed is:

1. A library cart loading system for placing library materials onto a selected shelf of a library cart, where each of the library materials is dimensionally described by a first cover side and opposing second cover side, an up-side and an opposing down-side, and a spine side and an opposing page side, said library cart loading system comprising:

a library cart, including a plurality of shelves each having first and second parallel widthwise end members, wherein associated with each of said shelves are (i) a lengthwise reference axis passing through a top surface plane of said shelf and extending perpendicularly through said first and second widthwise end members thereof, (ii) a widthwise reference axis passing through said top surface plane, parallel with a ground plane and perpendicular to said lengthwise reference axis, and (iii) a vertical axis perpendicular to said lengthwise and widthwise reference axes;

a library cart tilting means for receiving said library cart, said library cart tilting means including means for tilting said cart so as to raise said second widthwise end member relative to said first widthwise end member of each of said shelves, such that said lengthwise axis associated with said top surface plane of each of said shelves is at a selected angle relative to said ground plane, and said widthwise reference axis associated with each of said shelves is parallel to said ground plane;

a library material placer means including,
a rack member having a planar-like supporting surface and a ledge member, said library material placer means adapted for supporting an individual item of library materials with a selected one of said up-side and down-side of said individual item resting on a ledge surface of said ledge member, and wherein said ledge surface is, itself lengthwise, parallel with said widthwise axis of said shelf and said planar surface thereof; and
pusher means coupled to said rack member for slidably pushing said individual item off of said ledge member in response to a push command signal; and control means for positioning said rack member (i) in proximity to a selected one of said plurality of shelves, and (ii) at a selected position along the lengthwise reference axis away from said shelf first widthwise end member associated with said selected one of said shelves, so that said individual library material may be pushed off of said rack onto said selected one of said plurality of shelves at a first unoccupied shelf space away from said first shelf end member associated therewith, such that said library materials may be stacked on each other, cover-side onto cover-side, with their respective spine sides perpendicular to said shelf top surface beginning from said first widthwise end member and continuing through to said second widthwise end member thereof.

2. The library cart loading system of claim 1, wherein said selected angle of said lengthwise axis of said library cart is fifteen degrees.

3. The library cart loading system of claim 1, wherein:
each of said library cart shelves includes opposing parallel peripheral edges disposed along top surfaces thereof extending generally lengthwise between said first and second widthwise end members, said shelves each further including at least one strip of retro-reflective material disposed along said peripheral edges generally in parallel with said lengthwise reference axis; and
said library cart loading system further includes control means being selectively responsive to a presence or absence of light reflected from said retro-reflective material so as to operatively position said placer means for successively placing said library materials onto said selected shelf from said first end member to said second end member thereof.

4. The library cart loading system of claim 3, wherein said placer means further includes light generating and receiving means for, respectively, (i) providing light to be reflected from said retro-reflective material, and (ii) receiving said light for said control means recognition of said presence of said light.

5. The library cart loading system of claim 1, wherein said control means for positioning said rack member includes a plurality of magnetically-coupled air-actuated piston cylinders each being responsive to a control signal for providing, in combination, positioning of said rack member (i) vertically in proximity to a selected shelf, and (ii) at a selected position along said lengthwise reference axis.

6. A method of placing library materials onto a selected shelf of a library cart comprising steps of:

providing a library cart for receiving library material to be placed thereupon, said library cart including a plurality of shelves each having first and second parallel widthwise end members, wherein associated with each of said shelves are (i) a lengthwise reference axis passing through a top surface plane of said shelf and extending perpendicular through said first and second widthwise end members thereof, (ii) a widthwise reference axis passing through said top surface plane, parallel with a ground plane, and perpendicular to said lengthwise reference axis, and (iii) a vertical axis perpendicular to said lengthwise and widthwise reference axes;

tilting said library cart so as to raise said second widthwise end member relative to said first widthwise end member of each of said shelves, such that said lengthwise axis associated with said top surface plane of each of said shelves is at a selected angle relative to said ground plane, and said widthwise reference axis associated with each of said shelves is parallel to said ground plane; and providing a library material placer means in proximity to said library cart for (i) supporting an individual item of library materials to be placed on said library cart, and (ii) slidably pushing said individual item onto said cart.

7. The method of claim 6, wherein said selected angle is fifteen degrees.

8. A method for manipulation of library materials, comprising the steps of:

tilting a library cart having at least one shelf such that an end of said library cart and a surface plane of said shelf are maintained at a position of 15 degrees above a horizontal at-rest ground plane;

placing an item of said library materials onto a receiver;

moving said receiver to a position adjacent and in proximity to said tilted library cart;

sensing a vacant open position on said shelf of said tilted cart; and pushing said item onto said shelf.

9. A library material handling system for receiving incoming library material items and loading said items onto a selected shelf of a selected library cart, where each of said library material items are dimensionally described by a first cover side and opposing second cover side, an up-side and an opposing downside, and a spine side and an opposing page side, the library material handling system comprising:

at least one library cart, including a plurality of shelves each having first and second parallel widthwise end members, wherein associated with each of said shelves are (i) a lengthwise reference axis passing through a top surface plane of said shelf and extending perpendicularly through said first and second widthwise end members thereof, (ii) a widthwise reference axis passing through said top surface plane, parallel with a ground plane and perpendicular to said lengthwise reference axis, and (iii) a vertical axis perpendicular to said lengthwise and widthwise reference axes;

a library cart tilting means for receiving said library cart, said library cart tilting means including means for tilting said cart so as to raise said second widthwise end member relative to said first widthwise end member of each of said shelves, such that said lengthwise axis associated with said top surface plane of each of said shelves is at a selected angle relative to said ground plane, and said widthwise reference axis associated with each of said shelves is parallel to said ground plane;

a library material placer means including, a rack member having a planar-like supporting surface and a ledge member, said library material placer means adapted for supporting an individual item of library materials with a selected one of said up-side and down-side of said individual item resting on a ledge surface of said ledge member, and wherein said ledge surface is, itself lengthwise, parallel with said widthwise axis of said shelf and said planar surface thereof; and pusher means coupled to said rack member for slidably pushing said individual item off of said ledge member in response to a push command signal;

a library material item depository for receiving items from a patron placed on an item transport;

processing station means for receiving said items from said transport, said processing station including means for squaring said item to a common linear reference;

means for reading an identifying label affixed to and associated with said item for determining which one of said plurality of shelves of said library cart upon which said item is intended to be loaded;

means coupled to said processing station for transporting said item to said rack member associated with a selected placer means; and control means cooperating with said processing station for positioning said rack member (i) in proximity to a selected one of said plurality of shelves, and (ii) at a selected position along the lengthwise reference axis away from said shelf first widthwise end member associated with said selected one of said shelves, so that said individual library material may be pushed off of said rack onto said selected one of said plurality of shelves at a first unoccupied shelf space away from said first shelf end member associated therewith, such that said library materials may be stacked on each other, cover-side onto cover-side, with their respective spine sides perpendicular to said shelf top surface beginning from said first widthwise end member and continuing through to said second widthwise end member thereof.

* * * * *